Feb. 2, 1954 — A. G. DAVIS — 2,667,701
GAUGE UNIT
Filed Sept. 8, 1952

INVENTOR.
ARTHUR G. DAVIS
BY Whittemore,
Hulbert & Belknap
ATTORNEYS

Patented Feb. 2, 1954

2,667,701

UNITED STATES PATENT OFFICE 2,667,701

GAUGE UNIT

Arthur G. Davis, Grosse Pointe Park, Mich.

Application September 8, 1952, Serial No. 308,343

4 Claims. (Cl. 33—172)

The present invention relates to a gage unit.

It is an object of the present invention to provide a gage unit provided with means designed to hold and protect standard dial indicators wherever accurate gauging is essential.

It is a further object of the present invention to provide a gage adapted to give maximum protection for the delicate indicators.

It is a further object of the present invention to provide a gage unit designed to provide for adjustment of the indicator within the unit.

It is a further object of the present invention to provide a safety adjustment which prevents over-travel of the indicator stem thereby preventing damage to the indicator.

It is a further object of the present invention to provide a unit designed to provide for adjustment to restrict indicator pointer travel to insure against more than a full revolution of the pointer and thereby to prevent inadvertent misreading of the indicator beyond gauging tolerance.

It is a further object of the present invention to provide external adjustment to permit fast positive setting of the indicator and unit to a master gauge setting.

It is a further object of the present invention to provide a unit characterized by a minimum of adjustment on the job due to the ability of the unit to absorb shock without affecting the indicator setting.

It is a further object of the present invention to provide an indicator unit adapted to be used with one of a plurality of adaptors designed for particular gauging jobs.

Other objects and features of the invention will become apparent as the description proceeds, especially when taken in conjunction with the accompanying drawings, wherein.

Figure 2:
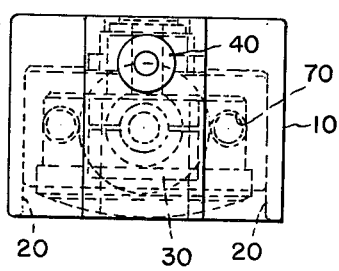
Figure 2 is a top plan view of the gage unit.

The gage unit comprises essentially a housing 10 which may conveniently be an aluminum casting. The housing as indicated in the figures, is generally elongated and is provided at one side with a relatively long recess 12 having an inner wall 14, a top wall 16, a bottom wall 18, and side walls 20. The bottom wall 18 is relatively thick and is provided with a passage 22 extending therethrough and communicating with the interior of the recess 12. The housing 10 is provided with a keyway indicated generally at 24 in which is longitudinally slidable a key slide 26. At its lower end the key slide 26 has a forwardly projecting recessed portion 28 adapted to receive a clamping element 30 adapted to be secured to the forwardly projecting portion 28 by screws 32. The clamping element 30 cooperates with the key slide to engage the lower portion of a conventional dial indicator 32' and to carry it for vertical adjustment.

Figure 1:
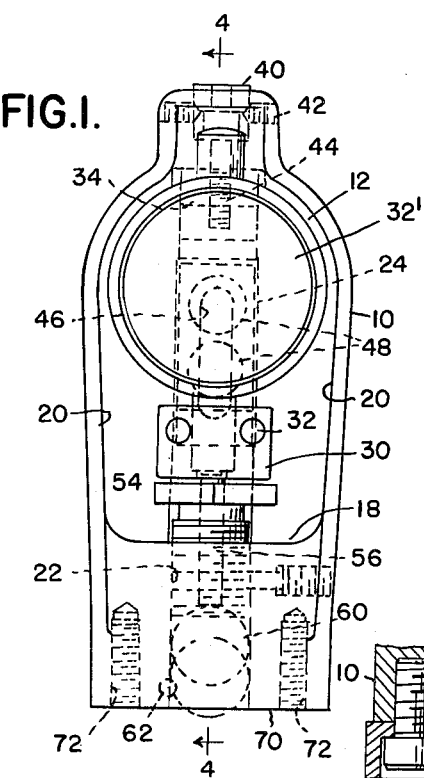
Figure 1 is a front elevation of the gage unit.
Figure 4:
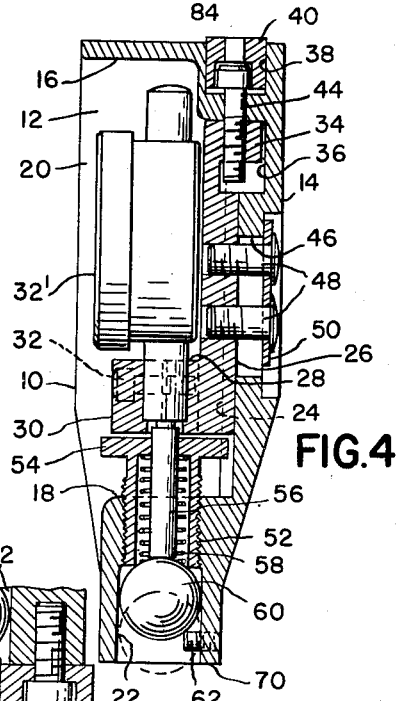
Figure 4 is a section on the line 4—4, Figure 1.

At its upper end the key slide 26 includes a rearwardly extending lug 34 which is threaded and which is movable in an elongated seat 36 formed in the inner wall of the housing. The top wall 16 of the housing includes a recess 38 in which is received an adjustment retainer cap 40, this cap being retained in position by set screws indicated at 42 in Figure 1. Retained in position by the adjustment retainer cap 40 is an adjustment screw 44, the lower end of which is threadedly engaged with the lug 34 of the key slide.

In addition, the inner wall 14 of the housing is provided with an elongated slot 46 through which extend a pair of clamping screws 48, these screws being threadedly engaged with the key slide 26 and extending through openings in a washer 50. It will be readily apparent that when the screws 48 are loosened the indicator 32' may be adjusted vertically by appropriate rotation of the adjusting screw 44, and the indicator may thereafter be locked in adjusted position by again tightening clamping screws 48.

At the lower end of the housing the passage 22 is threaded as indicated at 52 at its upper end and receives an adjusting thimble 54 which has an opening therethrough for receiving the plunger 56 of the dial indicator. The opening through the thimble is enlarged at the lower portion thereof for the reception of a light compression spring 58. Below the lower end of the thimble 54 is received a ball 60 and a set screw 62 is provided which prevents movement of the ball 60 out of the passage 22.

It will be apparent from the foregoing that the ball 60 has a range of movement limited in the first place by its engagement with the set screw 62 and inwardly by engagement with the lower end of the adjusting thimble 54. It will also be apparent that the thimble 54 may be adjusted independently of the indicator.

At its lower end the housing includes a flat surface 70 tapped as indicated at 72 for the reception of screws 74 adapted to position various adaptors or gauge bars thereto. It is contemplated that the gage unit will be a standard item and that the adaptors or gauge bars used therewith will be supplied to the user or made by him for special applications. In any case however, the adaptor or gauge bar unit intended for association with the gage unit will include a member constituting an extension of the housing and a movable work engaging part carried thereby.

Figure 5:
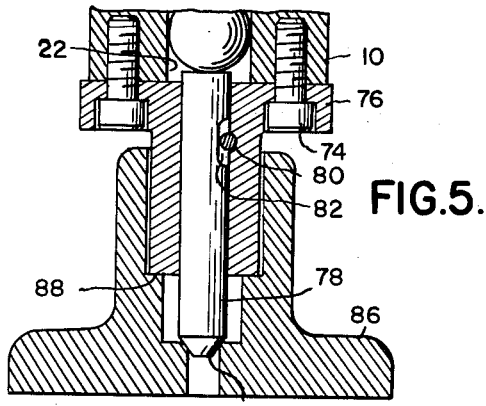
Figure 5 is a fragmentary sectional view illustrating a typical application of the gage unit and adaptor.

Referring now to Figure 5, there is illustrated an adaptor 76 secured by the screws 74 to the lower end of the housing 10 and having therein a movable work engaging part or pin 78. In this particular adaptor movement of the pin 78 is restricted by a screw 80 received in a recess 82 formed in a side of the pin 78. In Figure 5 the use of the device is illustrated and the gage is employed to indicate the countersink at 84 on the work piece 86 with reference to a gauging surface 88 thereon engaged by the lower end of the adaptor 76.

Figures 3, 6:
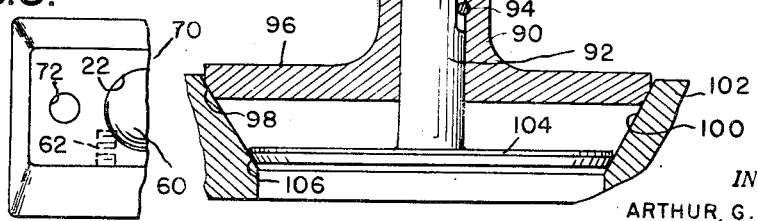
Figure 3 is a fragmentary bottom plan view of the gage unit.
Figure 6 is a fragmentary sectional view showing a second typical application of the gage unit and adaptor.

In Figure 6 there is illustrated another use of the structure in which an adaptor 90 is secured to the lower end of the housing 10 by the screw 74. In this case the adaptor 90 includes a movable work engaging part 92, movement of which is restricted by a cross pin or set screw 94. The adaptor 90 includes a disc-like part 96 having a beveled lower edge 98 adapted to seat within the conical surface 100 of the work piece 102. The lower end of the work engaging part includes a disc-like part 104 also beveled as indicated at 106 to engage the conical surface 100. Thus, the surface 98 of the adaptor engages the locating surface 100 and the reading of the dial indicator will thus afford an accurate indication of the angle of the conical surface.

The foregoing two illustrations of intended use of the instrument are merely illustrative and the device is capable of a great many widely divergent gauging operations dependent only upon the provision of simple adaptors for the basic instrument.

The basic gage unit as illustrated in Figures 1–4 will always be used in conjunction with a special gauge or adaptor mounted on the base of the unit. This special gauge or adaptor will be of a flush pin type as illustrated in Figures 5 and 6, with the flush pin coming into direct contact with the ball as shown in Figures 5 and 6.

In the preferred embodiment of the invention, in order to position the indicator 32' through .200" of adjustment range, the screws 48 are loosened and the adjusting screw 44 is turned until the special gauge, seating on a master part, allows the pointer of the indicator to travel through at least one-half of the gauging tolerance. Thereafter, screws 48 are tightened. The gauge is thereafter removed from the master and the thimble 54 is adjusted to allow the indicator pointer to travel at least the full gauging tolerance. Thereafter, the gauge is replaced on the master part and the face of the indicator is set to read zero. Following this adjustment the device may be used as a master gauge and accurately finished parts may be gauge exactly from a zero indication.

The drawings and the foregoing specification constitute a description of the improved gage unit in such full, clear, concise and exact terms as to enable any person skilled in the art to practice the invention, the scope of which is indicated by the appended claims.

What I claim as my invention is:

1. A gage unit for use with an indicator of the type having a casing, a sleeve extending from the casing, and a plunger reciprocable through said sleeve, said gage unit comprising a housing having a recess at one side dimensioned to receive the indicator, said recess having at its inner side vertically extending ways, a slide vertically movable in said ways and including clamping means at its lower end engageable with the indicator sleeve and having an opening through which the indicator plunger extends, means for clamping said slide in any position of vertical adjustment along said ways, a downwardly open ball receiving chamber at the lower end of said housing, said housing having a threaded passage connecting the bottom wall of said recess and said chamber, a tubular thimble in said threaded passage having an opening for receiving the plunger of an indicator mounted on said slide, said thimble having a headed adjusting portion accessible for ready adjustment of said thimble in said recess, a ball in said chamber adapted to engage the end of an indicator plunger, means at the lower end of said chamber preventing removal of said ball therefrom, and resilient means in said thimble engaging said ball and effective to urge said ball downwardly.

2. A gage unit for use with an indicator of the type having a casing, a sleeve extending from the casing, and a plunger reciprocable through said sleeve, said gage unit comprising a housing having a recess at one side dimensioned to receive the indicator, said recess having at its inner side vertically extending ways, a slide vertically movable in said ways and including means for supporting an indicator thereon, means for clamping said slide in any position of vertical adjustment along said ways, a downwardly open ball receiving chamber at the lower end of said housing, said housing having a threaded passage connecting the bottom wall of said recess and said chamber, a tubular thimble in said threaded passage having an opening for receiving the plunger of an indicator mounted on said slide, a ball in said chamber adapted to engage the end of an indicator plunger, means at the lower end of said chamber preventing removal of said ball therefrom, and resilient means in said thimble engaging said ball and effective to urge said ball downwardly.

3. A gage unit for use with an indicator of the type having a casing, a sleeve extending from the casing, and a plunger reciprocable through said sleeve, said gage unit comprising a housing having a recess at one side dimensioned to receive the indicator, said recess having at its inner side vertically extending ways, a slide vertically movable in said ways and including means for supporting an indicator thereon, means for clamping said slide in any position of vertical adjustment along said ways, a downwardly open ball receiving chamber at the lower end of said housing, said housing having a threaded passage connecting the bottom wall of said recess and said chamber, a tubular thimble in said threaded passage having an opening for receiving the plunger of an indicator mounted on said slide, a ball in said chamber adapted to engage the end of an indicator plunger, means at the lower end of said chamber preventing removal of said ball therefrom, resilient means in said thimble engaging said ball and effective to urge said ball downwardly, the lower end of said housing having means for attachment thereto of a selected adaptor, the adaptor including a fixed part engageable with a portion of a work piece and a movable part engageable with said ball and with a second portion of a work piece.

4. A gage unit designed to mount an indicator of the type comprising a casing and a movable plunger extending therefrom and designed for connection to an adaptor including a fixed part engageable with a gauging surface of a work piece and a movable part engageable with a surface of the work piece to be gauged, said unit comprising a housing having a recess at one side thereof for receiving the indicator and a passage extending laterally from said recess into which the indicator plunger extends, indicator mounting means in said recess adjustable toward and away from said passage, a tubular thimble in said passage adjustable longitudinally therein, and in which the indicator plunger is longitudinally movable, a ball in said passage outwardly of said thimble and engageable with the end of said thimble at one limit of its movement, means at the outer end of said passage preventing escape of the ball therefrom, means for mounting the fixed part of the adaptor to said housing adjacent said passage with the movable part thereof extending into the outer end of said passage into engagement with said ball.

ARTHUR G. DAVIS.

References Cited in the file of this patent

UNITED STATES PATENTS

| Number | Name | Date |
|---|---|---|
| 1,448,373 | Bartholdy | Mar. 13, 1923 |
| 1,664,583 | Wheelock | Apr. 3, 1928 |
| 2,052,153 | Willis | Aug. 25, 1936 |
| 2,445,875 | Emery | July 27, 1948 |
| 2,454,246 | Warthen | Nov. 16, 1948 |

FOREIGN PATENTS

| Number | Country | Date |
|---|---|---|
| 367,302 | Germany | Jan. 19, 1923 |
| 339,507 | Germany | Dec. 21, 1919 |